US010052565B2

(12) United States Patent
Heath et al.

(10) Patent No.: US 10,052,565 B2
(45) Date of Patent: Aug. 21, 2018

(54) TREATER COMBINATION UNIT

(71) Applicants: Rodney T. Heath, Farmington, NM (US); Gary Heath, Farmington, NM (US); Forrest D. Heath, Katy, TX (US)

(72) Inventors: Rodney T. Heath, Farmington, NM (US); Gary Heath, Farmington, NM (US); Forrest D. Heath, Katy, TX (US)

(*) Notice: Subject to any disclaimer, the term of this patent is extended or adjusted under 35 U.S.C. 154(b) by 859 days.

(21) Appl. No.: 13/891,944

(22) Filed: May 10, 2013

(65) Prior Publication Data

US 2013/0319844 A1 Dec. 5, 2013

Related U.S. Application Data

(60) Provisional application No. 61/645,416, filed on May 10, 2012.

(51) Int. Cl.
*C10L 3/10* (2006.01)
*B01D 5/00* (2006.01)
(Continued)

(52) U.S. Cl.
CPC ......... *B01D 5/0006* (2013.01); *B01D 17/042* (2013.01); *C10G 31/06* (2013.01);
(Continued)

(58) Field of Classification Search
CPC .... C10L 3/10; C10L 3/08; C10L 3/101; C10L 3/102; C10L 3/103; C10L 3/104;
(Continued)

(56) References Cited

U.S. PATENT DOCUMENTS 844,694 A 2/1907 Smith
1,903,481 A 4/1933 Schweisthal
(Continued)

FOREIGN PATENT DOCUMENTS

AR 011862 9/2000
AR 024366 10/2002
(Continued)

OTHER PUBLICATIONS

Heater-treater. (n.d.) McGraw-Hill Dictionary of Scientific & Technical Terms, 6E. (2003). Retrieved Jul. 27, 2016 from http://encyclopedia2.thefreedictionary.com/heater-treater.*
(Continued)

*Primary Examiner* — Jonathan Miller
*Assistant Examiner* — Jonathan Luke Pilcher
(74) *Attorney, Agent, or Firm* — Peacock Law P.C.; Deborah A. Peacock; Justin R. Jackson (57) ABSTRACT

A treater combination unit wherein the functions of a heater treater and one or more of a sales gas heater, instrument gas heater/dryer, two-phase separator, and a free water knockout are incorporated into a single unit are included in a single, self-contained and optionally portable unit. In one embodiment, an instrument gas dryer can also optionally be incorporated into the combination unit. In an alternative embodiment, the instrument gas dryer is added to the unit as a retrofit.

16 Claims, 11 Drawing Sheets

(51) Int. Cl.
*C10G 31/06* (2006.01)
*C10K 1/08* (2006.01)
*B01D 17/04* (2006.01)

(52) U.S. Cl.
CPC ...... *C10K 1/08* (2013.01); *C10L 3/10* (2013.01);
*C10L 3/101* (2013.01); *C10L 3/106* (2013.01)

(58) Field of Classification Search
CPC .......... C10L 3/105; C10L 3/106; C10L 3/107;
C10L 3/108; C10G 5/06; C10G
2300/1025; B01D 5/0006; B01D 53/26;
B01D 53/265; E21B 43/34
USPC ...................................... 96/295, 181; 95/42
See application file for complete search history.

(56) References Cited

U.S. PATENT DOCUMENTS

| | | |
|---|---|---|
| 2,138,218 A | 11/1938 | Raigorodsky |
| 2,225,959 A | 12/1940 | Miller |
| 2,726,729 A | 12/1955 | Williams |
| 2,738,026 A | 3/1956 | Glasgow et al. |
| 2,765,872 A | 10/1956 | Hartman et al. |
| 2,786,543 A | 3/1957 | Hayes et al. |
| 2,812,827 A | 11/1957 | Worley et al. |
| 2,815,901 A | 12/1957 | Hale |
| 2,853,149 A | 9/1958 | Gosselin |
| 2,937,140 A | 5/1960 | Stinson |
| 2,970,107 A | 1/1961 | Gilmore |
| 2,984,360 A | 5/1961 | Smith |
| 3,018,640 A | 1/1962 | Heller et al. |
| 3,025,928 A | 3/1962 | Heath |
| 3,027,651 A | 4/1962 | Nerge |
| 3,094,574 A | 6/1963 | Glasgow et al. |
| 3,105,855 A | 10/1963 | Meyers |
| 3,152,753 A | 10/1964 | Adams |
| 3,182,434 A | 5/1965 | Fryar |
| 3,232,027 A | 2/1966 | Lorenz et al. |
| 3,237,847 A | 3/1966 | Wilson |
| 3,254,473 A | 6/1966 | Fryar et al. |
| 3,255,573 A | 6/1966 | Cox, Jr. et al. |
| 3,288,448 A | 11/1966 | Patterson et al. |
| 3,321,890 A | 5/1967 | Barnhart |
| 3,347,019 A | 10/1967 | Barnhart |
| 3,360,127 A | 12/1967 | Wood, Jr. |
| 3,396,512 A | 8/1968 | McMinn et al. |
| 3,398,723 A | 8/1968 | Smalling |
| 3,407,052 A | 10/1968 | Huntress et al. |
| 3,528,758 A | 9/1970 | Perkins |
| 3,540,821 A | 11/1970 | Siegmund |
| 3,541,763 A | 11/1970 | Heath et al. |
| 3,589,984 A | 6/1971 | Reid |
| 3,616,598 A | 11/1971 | Floral, Jr. |
| 3,648,434 A | 3/1972 | Graves, III et al. |
| 3,659,401 A | 5/1972 | Giammarco |
| 3,662,017 A | 5/1972 | Woerner et al. |
| 3,672,127 A | 6/1972 | Mayse et al. |
| 3,736,725 A | 6/1973 | Alleman et al. |
| 3,817,687 A | 6/1974 | Cavallero et al. |
| 3,829,521 A | 8/1974 | Green |
| 3,855,337 A | 12/1974 | Foral, Jr. et al. |
| 3,872,682 A | 3/1975 | Shook |
| 3,949,749 A | 4/1976 | Stewart |
| 3,989,487 A | 11/1976 | Peterson |
| 4,009,985 A | 3/1977 | Hirt |
| 4,010,009 A | 3/1977 | Moyer |
| 4,010,065 A | 3/1977 | Alleman |
| 4,058,147 A | 11/1977 | Stary et al. |
| 4,098,303 A | 7/1978 | Gammell |
| 4,108,618 A | 8/1978 | Schneider |
| 4,118,170 A | 10/1978 | Hirt |
| 4,134,271 A | 1/1979 | Datia |
| 4,139,596 A * | 2/1979 | Vaseen ................. C01B 17/775 204/174 |
| 4,162,145 A | 7/1979 | Alleman |
| 4,165,618 A | 8/1979 | Tyree, Jr. |
| 4,198,214 A | 4/1980 | Heath et al. |
| 4,270,938 A | 6/1981 | Schmidt et al. |
| 4,286,929 A | 9/1981 | Heath et al. |
| 4,305,895 A | 12/1981 | Heath et al. |
| 4,322,265 A | 3/1982 | Wood |
| 4,332,643 A | 6/1982 | Reid |
| 4,342,572 A | 8/1982 | Heath |
| 4,362,462 A | 12/1982 | Blotenberg |
| 4,369,049 A | 1/1983 | Heath |
| 4,396,371 A | 8/1983 | Lorenz et al. |
| 4,402,652 A | 9/1983 | Gerlach et al. |
| 4,421,062 A | 12/1983 | Padilla, Sr. |
| 4,431,433 A | 2/1984 | Gerlach et al. |
| 4,435,196 A | 3/1984 | Pielkenrood |
| 4,459,098 A | 7/1984 | Turek et al. |
| 4,462,813 A | 7/1984 | May et al. |
| 4,474,549 A | 10/1984 | Capone |
| 4,474,550 A | 10/1984 | Heath et al. |
| 4,493,770 A | 1/1985 | Moilliet |
| 4,501,253 A | 2/1985 | Gertsmann et al. |
| 4,505,333 A | 3/1985 | Ricks |
| 4,511,374 A | 4/1985 | Heath |
| 4,539,023 A | 9/1985 | Boley |
| 4,568,268 A | 2/1986 | Gerlach et al. |
| 4,579,565 A | 4/1986 | Heath |
| 4,583,998 A | 4/1986 | Reid et al. |
| 4,588,372 A | 5/1986 | Torborg |
| 4,588,424 A | 5/1986 | Heath et al. |
| 4,597,733 A | 7/1986 | Dean et al. |
| 4,615,673 A | 10/1986 | Heath et al. |
| 4,617,030 A | 10/1986 | Heath |
| 4,659,344 A | 4/1987 | Gerlach et al. |
| 4,674,446 A | 6/1987 | Padilla, Sr. |
| 4,676,806 A | 6/1987 | Dean et al. |
| 4,689,053 A | 8/1987 | Heath |
| 4,701,188 A | 10/1987 | Mims |
| 4,715,808 A | 12/1987 | Heath et al. |
| 4,737,168 A | 4/1988 | Heath |
| 4,778,443 A | 10/1988 | Sands et al. |
| 4,780,115 A | 10/1988 | Ranke |
| 4,824,447 A | 4/1989 | Goldsberry |
| 4,830,580 A | 5/1989 | Hata et al. |
| 4,919,777 A | 4/1990 | Bull |
| 4,948,393 A | 8/1990 | Hodson et al. |
| 4,949,544 A | 8/1990 | Hines |
| 4,978,291 A | 12/1990 | Nakai |
| 4,983,364 A | 1/1991 | Buck et al. |
| 5,016,447 A | 5/1991 | Lane et al. |
| 5,080,802 A | 1/1992 | Cairo, Jr. et al. |
| 5,084,074 A | 1/1992 | Beer et al. |
| 5,129,925 A | 7/1992 | Marsala et al. |
| 5,130,078 A | 7/1992 | Dillman |
| 5,132,011 A | 7/1992 | Ferris |
| 5,163,981 A | 11/1992 | Choi |
| 5,167,675 A | 12/1992 | Rhodes |
| 5,191,990 A | 3/1993 | Fritts |
| 5,195,587 A | 3/1993 | Webb |
| 5,209,762 A | 5/1993 | Lowell |
| 5,249,739 A | 10/1993 | Bartels et al. |
| 5,269,886 A | 12/1993 | Brigham |
| 5,346,537 A | 9/1994 | Lowell |
| 5,377,723 A | 1/1995 | Hilliard |
| 5,419,299 A | 5/1995 | Fukasawa et al. |
| 5,453,114 A | 9/1995 | Ebeling |
| 5,476,126 A | 12/1995 | Hilliard et al. |
| 5,490,873 A | 2/1996 | Behrens et al. |
| 5,501,253 A | 3/1996 | Weiss |
| 5,513,680 A | 5/1996 | Hilliard et al. |
| 5,536,303 A | 7/1996 | Ebeling |
| 5,571,310 A | 11/1996 | Nanaji |
| 5,579,740 A | 12/1996 | Cotton et al. |
| 5,626,027 A | 5/1997 | Dormer et al. |
| 5,664,144 A | 9/1997 | Yanai et al. |
| 5,665,144 A | 9/1997 | Hill et al. |
| 5,678,411 A | 10/1997 | Matsumura et al. |
| 5,755,854 A | 5/1998 | Nanaji |
| 5,766,313 A | 6/1998 | Heath |
| 5,826,433 A | 10/1998 | Dube |

(56) References Cited

U.S. PATENT DOCUMENTS

| | | |
|---|---|---|
| 5,857,616 A | 1/1999 | Karnoff et al. |
| 5,878,725 A | 3/1999 | Osterbrink |
| 5,882,486 A | 3/1999 | Moore |
| 5,885,060 A | 3/1999 | Cunkelman et al. |
| 5,988,232 A | 11/1999 | Koch et al. |
| 6,004,380 A | 12/1999 | Landreau et al. |
| 6,010,674 A | 1/2000 | Miles et al. |
| 6,023,003 A | 2/2000 | Dunning et al. |
| 6,027,311 A | 2/2000 | Hill et al. |
| 6,095,793 A | 8/2000 | Greeb |
| 6,142,191 A | 11/2000 | Sutton et al. |
| 6,183,540 B1 | 2/2001 | Thonsgaard |
| 6,193,500 B1 | 2/2001 | Bradt et al. |
| 6,223,789 B1 | 5/2001 | Koch |
| 6,224,369 B1 | 5/2001 | Moneyhun |
| 6,238,461 B1 | 5/2001 | Heath |
| 6,251,166 B1 | 6/2001 | Anderson |
| 6,273,937 B1 | 8/2001 | Schucker |
| 6,299,671 B1 | 10/2001 | Christensen |
| 6,314,981 B1 | 11/2001 | Mayzou et al. |
| 6,332,408 B2 | 12/2001 | Howlett |
| 6,363,744 B2 | 4/2002 | Finn et al. |
| 6,364,933 B1 | 4/2002 | Heath |
| 6,425,942 B1 | 7/2002 | Forster |
| 6,461,413 B1 | 10/2002 | Landreau et al. |
| 6,478,576 B1 | 11/2002 | Bradt et al. |
| 6,499,476 B1 | 12/2002 | Reddy |
| 6,532,999 B2 | 3/2003 | Pope et al. |
| 6,533,574 B1 | 3/2003 | Pechoux |
| 6,537,349 B2 | 3/2003 | Choi et al. |
| 6,537,458 B1 | 3/2003 | Polderman |
| 6,551,379 B2 | 4/2003 | Heath |
| 6,604,558 B2 | 8/2003 | Sauer |
| 6,616,731 B1 | 9/2003 | Hillstrom |
| 6,719,824 B1 | 4/2004 | Bowser |
| 6,745,576 B1 | 6/2004 | Granger |
| 6,931,919 B2 | 8/2005 | Weldon |
| 6,984,257 B2 | 1/2006 | Heath et al. |
| 7,005,057 B1 | 2/2006 | Kalnes |
| 7,025,084 B2 | 4/2006 | Perry et al. |
| 7,131,265 B2 | 11/2006 | Lechner |
| RE39,944 E | 12/2007 | Heath |
| 7,350,581 B2 | 4/2008 | Wynn |
| 7,481,237 B2 | 1/2009 | Jones et al. |
| 7,497,180 B2 | 3/2009 | Karlsson et al. |
| 7,531,030 B2 | 5/2009 | Heath et al. |
| 7,575,672 B1 | 8/2009 | Gilmore |
| 7,791,882 B2 | 9/2010 | Chu et al. |
| 7,905,722 B1 | 3/2011 | Heath et al. |
| 8,529,215 B2 | 9/2013 | Heath et al. |
| 8,840,703 B1 | 9/2014 | Heath et al. |
| 8,864,887 B2 | 10/2014 | Heath et al. |
| 8,900,343 B1 | 12/2014 | Heath et al. |
| 2001/0008073 A1 | 7/2001 | Finn et al. |
| 2002/0073843 A1 | 6/2002 | Heath |
| 2002/0081213 A1 | 6/2002 | Takahashi et al. |
| 2002/0178918 A1 | 12/2002 | Lecomte et al. |
| 2002/0185006 A1 | 12/2002 | Lecomte et al. |
| 2003/0005823 A1 | 1/2003 | Le Blanc et al. |
| 2003/0167690 A1 | 9/2003 | Edlund et al. |
| 2004/0031389 A1 | 2/2004 | Heath et al. |
| 2004/0186630 A1 | 9/2004 | Shier et al. |
| 2004/0211192 A1 | 10/2004 | Lechner |
| 2005/0115248 A1 | 6/2005 | Koehler et al. |
| 2005/0266362 A1 | 12/2005 | Stone et al. |
| 2006/0144080 A1 | 7/2006 | Heath et al. |
| 2006/0156744 A1 | 7/2006 | Cusiter et al. |
| 2006/0156758 A1 | 7/2006 | An et al. |
| 2006/0218900 A1 | 10/2006 | Lechner |
| 2006/0254777 A1 | 11/2006 | Wynn |
| 2006/0260468 A1 | 11/2006 | Amin |
| 2007/0051114 A1 | 3/2007 | Mahlanen |
| 2007/0084341 A1 | 4/2007 | Heath et al. |
| 2007/0151292 A1 | 7/2007 | Heath et al. |
| 2007/0175226 A1 | 8/2007 | Karlsson et al. |
| 2007/0186770 A1 | 8/2007 | Heath et al. |
| 2007/0199696 A1 | 8/2007 | Walford |
| 2008/0008602 A1 | 1/2008 | Pozivil et al. |
| 2008/0120993 A1 | 5/2008 | An et al. |
| 2009/0133578 A1 | 5/2009 | Brasa et al. |
| 2009/0223246 A1* | 9/2009 | Heath .............. C10L 3/10 62/618 |
| 2010/0040989 A1 | 2/2010 | Heath et al. |
| 2010/0083678 A1 | 4/2010 | Lifson et al. |
| 2010/0083691 A1 | 4/2010 | Immink et al. |
| 2010/0263393 A1 | 10/2010 | Chen et al. |
| 2010/0313586 A1 | 12/2010 | Yakumaru et al. |
| 2012/0079851 A1 | 4/2012 | Heath et al. |
| 2012/0261092 A1 | 10/2012 | Heath et al. |

FOREIGN PATENT DOCUMENTS

| | | |
|---|---|---|
| CA | 2281610 | 9/1998 |
| CA | 2426071 | 10/2003 |
| CA | 2224389 | 2/2008 |
| CA | 2311440 | 6/2011 |
| CA | 2563747 | 5/2013 |
| CA | 2523110 | 8/2014 |
| CA | 2541606 | 10/2014 |
| CA | 2809118 | 2/2015 |
| CA | 2573514 | 9/2015 |
| FR | 2542039 | 9/1984 |
| GB | 370591 | 4/1932 |
| GB | 573819 | 12/1945 |
| JP | 58185990 A | 10/1983 |
| RU | 1801092 | 3/1993 |
| RU | 2159913 | 11/2000 |
| SU | 1021809 | 6/1983 |
| WO | 2005/068847 | 7/2005 |
| WO | 2010/080040 | 7/2010 |
| WO | 2013/170190 | 11/2013 |

OTHER PUBLICATIONS

"Environmental Technology Verification Report", Greenhouse Gas Technology Center Southern Research Institute.
"Natural Gas Dehydration", The Environmental Technology Verification Program, Sep. 2003.
Archer, "TEG Regenerator Vapor Recovery in Amoco's Northwestern Business Unit", Amoco Northwestern Business Unit, Aug. 1992.
Reid, "Coldfinger an Exhauster for Removing Trace Quantities of Water from Glycol Solutions Used for Gas Dehydration", Ball-Reid Engineers, Inc., Oklahoma City, Oklahoma, 1975, 592-602.

* cited by examiner

TREATER COMBINATION UNIT

CROSS-REFERENCE TO RELATED APPLICATIONS

This application claims priority to and the benefit of the filing of U.S. Provisional Patent Application Ser. No. 61/645,416, entitled "Treater Combination Unit", filed on May 10, 2012, and the specification thereof is incorporated herein by reference.

BACKGROUND OF THE INVENTION

Field of the Invention (Technical Field)

Embodiments of the present invention relate to a treater combination unit, and more particularly to a treater combination unit which preferably performs the functions of a heater treater and one or more of the following: a sales gas heater, an instrument gas heater/dryer, a free water knock-out, and/or a two-phase separator, and which can optionally be transportable in a single self-contained unit.

Description of Related Art

Currently many well production systems rely on a heater treater and a two-phase separator and a gas heater. However, such units are typically large stand-alone units which are typically transported and erected, housed, and connected individually one-at-a-time at a well site. This results in significant costs in shipping, placing, and interconnecting such locations at a remote well site. Often, such systems do not fit together simply. Because well sites are often significant distances from the nearest parts suppliers, the installation and interconnection of such components is often forced to be suspended while workers go in search of needed interconnecting components.

Further, because some of the features of some of the systems have similar needs—such as a heat-sinking fluid source and a heat source, the use of such stand-alone units results in significant energy waste and inefficiencies by each component re-creating the same features that are already provided on other units at a well site. Not only does this result in highly inefficient overall system design, it also significantly increases the overall cost—not only in the additional time and expense in setting up and connecting the equipment, but also in the duplication of similar components for each stand-alone unit.

There is thus a need for an apparatus, method, and system which can replace several of the stand-alone units at a well site with a single combined, cost-effective unit and which can greatly speed up the time required to set up a well site, thus resulting in a significant cost savings and a faster return on investment for companies drilling wells.

BRIEF SUMMARY OF EMBODIMENTS OF THE PRESENT INVENTION

An embodiment of the present invention relates to a combination heater treater, gas heater, and two-phase separator system comprising a heater treater, a gas heater, a two-phase separator, a first heating coil disposed in the heater treater through which natural gas from a well casing is directed, a second heating coil through which instrument gas is passed before going into a condenser, a third heating coil through which the instrument gas having already passed through the condenser passes, and the first, second and third heating coils disposed within the low pressure heater treater. In one embodiment, the system can also include a high pressure inlet separator wherein a lower portion of the inlet separator is disposed within the low pressure treater. The system can also include an instrument gas scrubber, an inlet of the instrument gas scrubber in fluid communication with an outlet of said third heating coil.

The system can also include a high pressure gas scrubber, an inlet of said high pressure gas scrubber in fluid communication with an outlet of said condenser. In one embodiment, the second heating coil and the condenser form an instrument gas dryer. In one embodiment, the heater treater, gas heater, and two-phase separator are all disposed on a single transportable frame, which can optionally comprise a skid and which can optionally be skid loaded onto a transport truck.

An embodiment of the present invention relates to a combination heater treater, gas heater, and two-phase separator having a heater treater, a gas heater, a two-phase separator, a first heating coil comprising an inlet, the inlet communicably coupled to an outlet of a well casing, a second heating coil comprising an inlet, the inlet communicably coupled to an outlet of a high pressure inlet separator, a third heating coil comprising an inlet, the inlet communicably coupled to an outlet of a condenser; and the first heating coil, second heating coil and third heating coil in thermal communication with one another.

An embodiment of the present invention relates to a treater combination system having a single transportable frame; a combination heater treater, gas heater and two-phase separator, which has a heat source, a first heating coil disposed therein through which natural gas from a well casing is directed, a second heating coil through which instrument gas is passed before going into a condenser, the first and second heating coils disposed within a low pressure treater, a high pressure inlet separator having an outlet communicably coupled to an inlet of the second heating coil; and the treater combination system disposed on the single transportable frame.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

An embodiment of the present invention relates to a treater combination unit, which preferably includes a heater-treater, a gas heater, and a two-phase separator. The treater combination unit preferably processes various components, such as gas, oil, and water, flowing and/or being pumped from petroleum wells. In a preferred embodiment, the treater combination unit is a single, self-contained, and easily transportable assembly. Optionally, it can be skid-mounted and can require no external electrical power. The treater combination unit preferably receives oil and water from well tubing and natural gas from well casing. By removing natural gas from the casing, the casing pressure is significantly reduced, thus enabling a higher flow rate of oil from the tubing, which is financially desirable.

In one embodiment, the treater combination unit preferably separates the liquid, which can include oil and water, and gas inputs into:

1) a flow of natural gas, which is temperature and pressure controlled and which is substantially free of liquids, such as oil and water;
2) a flow of warm oil that is substantially free of gas and water; and
3) a flow of water that is substantially free of oil and gas.

The resulting oil can then be sent to storage tanks for sale. Of the natural gas that is processed by the treater combination unit, most of it is sold as product. However, some of it is preferably used as a fuel source for heating in the treater combination unit. In addition, some of the natural gas can optionally be used to operate the valves, temperature controllers, and other components on the treater combination unit system.

In one embodiment, the present invention separates petroleum components in all weather conditions (including below freezing ambient temperatures) without electricity. In particular, the supply gas dryer component of an embodiment of the present invention provides the ability to operate the treater combination unit as a self-contained system in sub-zero temperatures.

Figure 1:
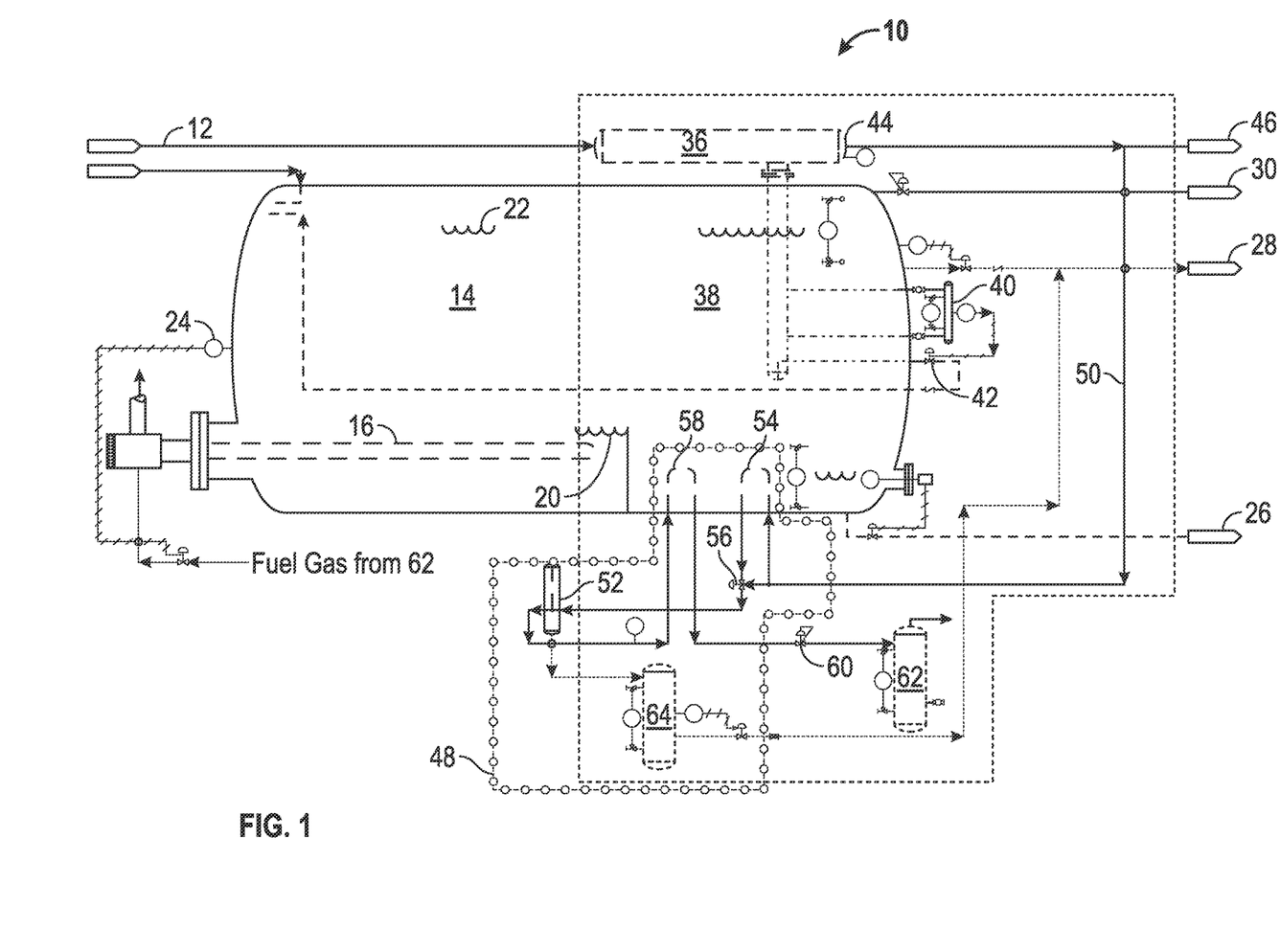
FIG. 1 is a drawing which schematically illustrates a process-flow diagram of a treater combination unit according to an embodiment of the present invention wherein a heater treater, a gas separator, an instrument gas heater/dryer and a sales gas heater are provided in a single combined unit.

Referring now to the drawings, fluids, which can include oil products containing entrained water and natural gas, can enter treater combination unit 10 at point 12. The fluids are preferably introduced into low pressure treater 14 from the well tubing. In one embodiment, low pressure treater 14 is preferably a low pressure treating separator which preferably comprises a diameter of about 3 feet to about 10 feet. In one embodiment, low pressure treater 14 comprises a length of about 10 feet to about 30 feet, and most preferably a length of about 20 feet. In one embodiment, the low pressure treater can have a working pressure rating of up to about 150 PSIG and most preferably a working pressure rating of up to about 75 PSIG. Low pressure treater 14 preferably has removable fire tube 16 and heating coil 18. In this embodiment, natural gas is preferably combusted in fire tube 16, thus releasing energy in the form of heat. The heat is preferably transferred to water bath 20 which is disposed in the lower portion of low pressure treater 14. Heat is further transferred from water bath 20 to oil layer 22 which preferably resides above water bath 20. Thermostat 24 is preferably in contact with oil layer 22. The amount of fuel entering the combustion process can preferably be controlled based on thermostat 24 so that the temperature of oil layer 22 is held at or near a constant value or range, which can be predetermine or can be user determined.

In one embodiment, the heat from the combustion process substantially degasses the oil into the gaseous layer above the oil inside of treater 14. Also, the heat helps the water entrained in the oil to separate such that the water settles into water bath 20 and the oil floats up to oil layer 22. Treater 14 is preferably sized to provide sufficient residence time to allow the freshly introduced well products to separate into various components. A system of baffles, weirs, and interfacing floats preferably ensure the correct water and oil levels within the low pressure treater. Water and oil can be released from low pressure treater 14 to separate storage tanks via outlets 26 and 28. The resulting natural gas is preferably released into a vapor recovery tower at outlet 30 to be compressed by a vapor recovery unit and then sent into a sales line.

In one embodiment, the natural gas from the casing of the well enters treater combination unit 10 through a temperature and pressure control system which preferably includes heating coli 18, three way temperature control valve 32, and automatic choke 34. After flowing through the temperature and pressure control system, the natural gas preferably enters high pressure inlet separator 36. In one embodiment, high pressure inlet separator 36 can have a diameter of about 10 to about 36 inches and most preferably a diameter of about 20 inches. In one embodiment, high pressure separator 36 can have a length of about 5 feet to about 20 feet and most preferably about 10 feet. In one embodiment, high pressure inlet separator 36 can have a maximum working pressure of up to about 1000 pounds per square inch gauge ("PSIG") and most preferably about 500 PSIG. High pressure inlet separator 36 is particularly effective when the temperature of the natural gas is maintained at a predetermined level—for example from about 70 degrees Fahrenheit to about 130 degrees Fahrenheit. To maintain this temperature, some of the natural gas coming from the well casing can be heated in heating coil 18, which can optionally be located inside low pressure treater 14. Three-way splitter valve 32 is preferably used to control the amount of gas that is heated by passing through the hot, low pressure treater. Splitter valve 32 preferably ensures that the natural gas entering high pressure inlet separator 36 is at a desired temperature or within a predetermined acceptable temperature range.

High pressure inlet separator 36 is preferably connected to high pressure liquid barrel 38 using flanges, thus enabling different sizes of inlet separators for varying well locations and conditions. In one embodiment, high pressure liquid barrel 38 can have a diameter of from about 6 inches to about 18 inches and most preferably a diameter of about 10.75 inches. In one embodiment, high pressure liquid barrel 38 can have a length of about 3 to about 10 feet and most preferably a length of about 5 feet to about 6 feet. In one embodiment, high pressure liquid barrel 38 can have a maximum working pressure rating of up to about 1000 PSIG and most preferably of up to about 500 PSIG. The natural gas entering high pressure inlet separator 36 will typically contain entrained oil and water. The oil and water can be separated from the natural gas in high pressure inlet separator 36. The oil and water are preferably collected in high pressure liquid barrel 38, which can be kept warm by being located in thermal communication with low pressure treater 14. The resulting liquids are preferably dumped to treater 14 by a liquid level control 40 and motor valve 42 for further processing with the incoming well products. The liquid-free natural gas is preferably released from high pressure inlet separator 36 at point 44. Depending upon the amount of natural gas produced, most of it can optionally be introduced into the natural gas sales line via outlet 46, and some of the natural gas can be sent to the gas dryer 48 through line 50. In one embodiment, gas dryer 48 can be integrally incorporated into treater combination unit 10. In an alternative embodiment, gas dryer 48 can be provided as a separate stand-alone unit or even as a retro-fit unit. In one embodiment, gas dryer 48 need not be provided.

Figure 2:
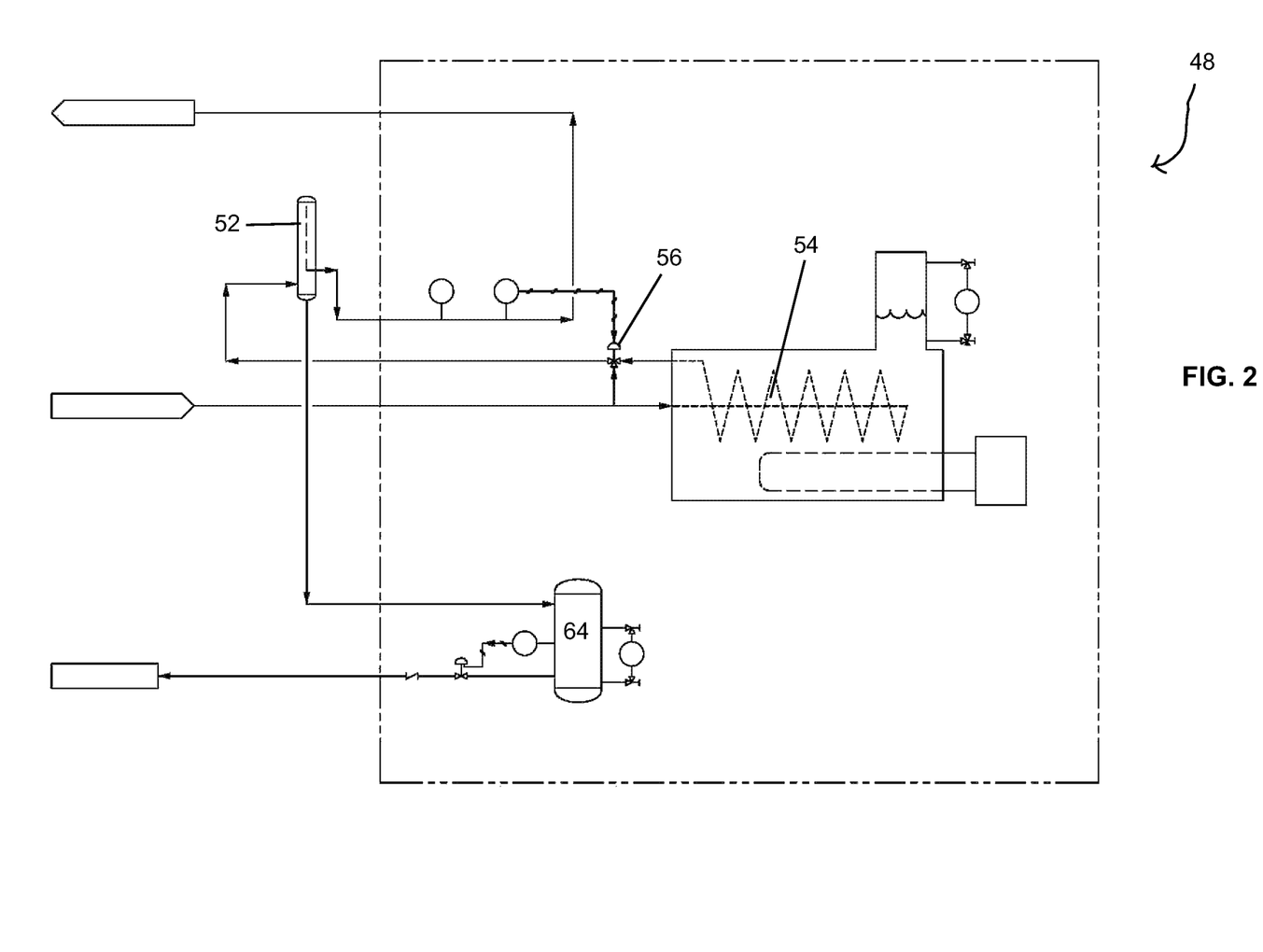
FIG. 2 is a drawing which schematically illustrates a gas dryer which can optionally be incorporated into and/or connected to an apparatus of an embodiment of the present invention.
Figure 3A:
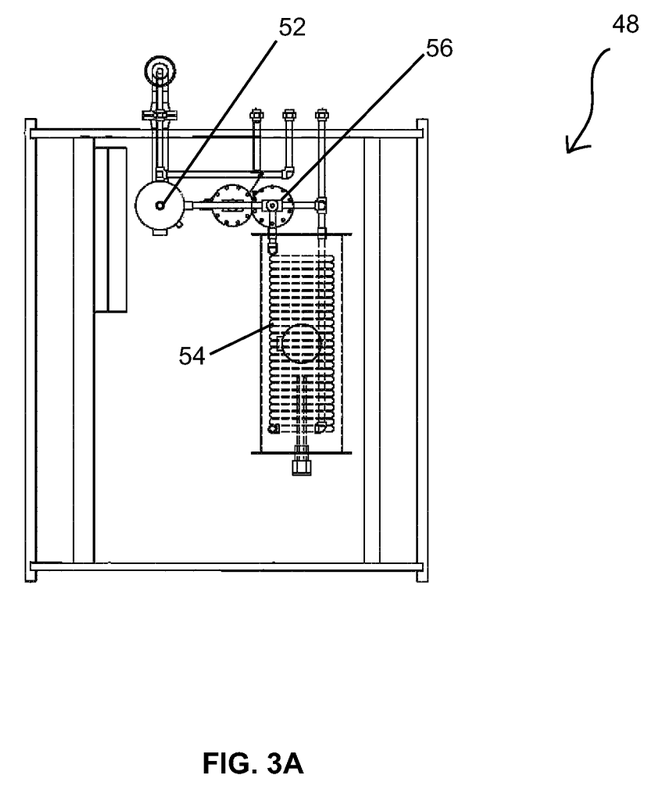
FIGS. 3A-D respectively illustrate top, front, rear, and left side views of a dryer which can optionally be incorporated and/or connected in accordance with an embodiment of the present invention.
Figure 3B:
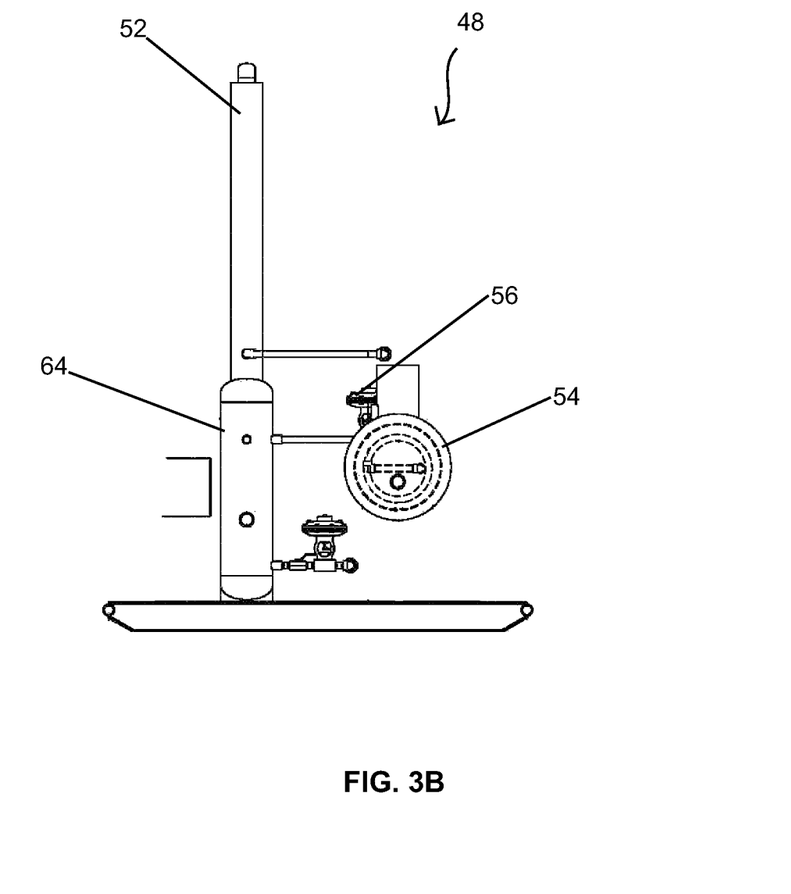
Figure 3C:
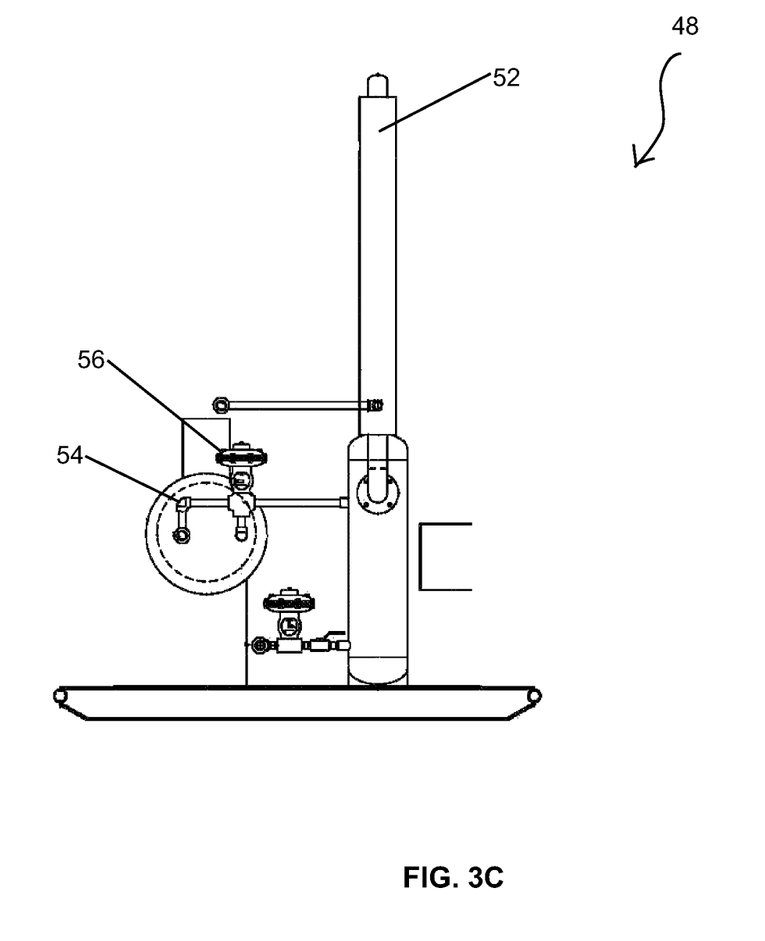
Figure 3D:
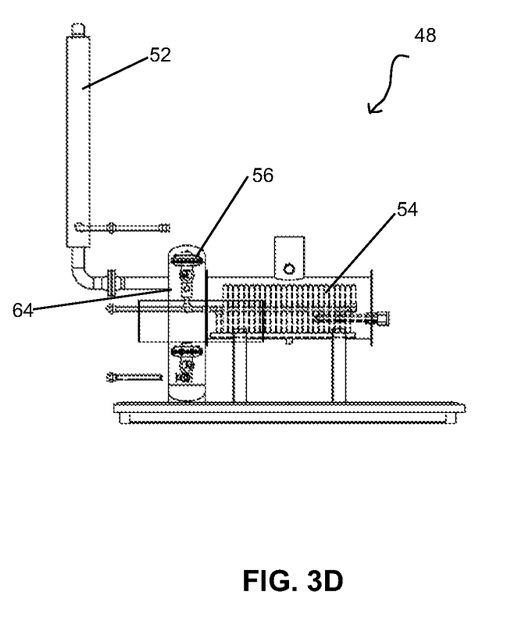

In one embodiment, condensing tube 52 of the gas dryer 48 is preferably mounted outside of an enclosure of treater 14. This allows condensing tube 52 to be exposed to ambient temperatures.

Prior to entering condensing tube 52 of gas dryer 48, the temperature of the natural gas is preferably raised, if necessary. This can optionally be done by passing it through heating coil 54, which can optionally be disposed within low pressure treater 14 or can be a heating coil separate from low pressure treater 14. Three-way splitter valve 56 is optionally provided in order to maintain the temperature of the natural gas in the condensing tube 52 by controlling the volume of gas flowing through heating coil 54.

In one embodiment, heated natural gas containing water and/or hydrocarbon vapors enters condensing tube 52 of the gas dryer system. When the warm natural gas comes in contact with the cold walls of condensing tube 52, water and hydrocarbon vapors condense on the inside wall of condensing tube 52. Condensing tube 52 is preferably surrounded by a conventional shield (such as a steel pipe) to help ensure that the liquid water on the inside wall of condensing tube 52 does not solidify into ice, as ice can insulate the system and significantly decrease the operating efficiency of natural gas dryer 48.

In one embodiment, the natural gas leaving gas dryer 48 is preferably sent to second heating coil 54, which is most preferably disposed within low pressure treater 14 before passing thru regulator 60 on the way to fuel/instrument gas scrubber 62. In one embodiment, fuel/instrument gas scrubber 62 can have a diameter of about 6 inches to about 18 inches and most preferably of about 10.75 inches. In one embodiment, the fuel/instrument gas scrubber 62 can have a length of about 18 inches to about 5 feet and most preferably a length of about 3 feet. In one embodiment, fuel/instrument gas scrubber 62 can have a maximum operating pressure of up to about 300 PSIG and most preferably of up to about 125 PSIG. Fuel/instrument gas scrubber 62 preferably removes any additional liquids from the natural gas before the natural gas is used to fuel the combustion process or control the splitter valves and level controllers, for embodiments where the natural gas is so used.

The condensate leaving condenser tube 52 is then preferably sent to high pressure gas scrubber 64, where the liquids are stored before being dumped—most preferably to a vapor recovery tower via outlet 28. In one embodiment, high pressure gas scrubber 64 can have a diameter of about 6 to about 18 inches and most preferably a diameter of about 10.75 inches. In one embodiment, high pressure gas scrubber 64 can have a length of about 18 inches to about 5 feet and most preferably a length of about 3 feet. In one embodiment, high pressure gas scrubber 64 can have a maximum working pressure rating of up to about 1000 PSIG and most preferably up to about 500 PSIG.

Referring now to FIGS. 4A-F, a free water knockout is preferably incorporated into a heater treater. As best illustrated therein, a flow of hydrocarbons from one or more hydrocarbon and water producing wells preferably enters an upper portion of treater combination unit 100 at point 110. Quieting baffle 112 is preferably disposed near an upper portion of combination unit 100 such that waves and near-surface turbulence particularly those caused by the flow of liquids entering through point 110 are reduced. Treater combination unit 100 is preferably divided into at least two chambers via bulkhead 120 (see FIGS. 4B and 4F). Bulkhead 120 is also provided and is solid so as to prevent mixing of liquids between heater tank portion 114 and free water knockout portion 116 of combination unit 100. In one embodiment, the upper portion of bulkhead 120 is open to allow gas and excess oil to pass from free water knockout portion 116 to heater tank portion 114. In one embodiment, an end portion of free water knockout portion 116 is preferably divided into 3 compartments, each housing a level control and an outlet (free water knockout water interfacing level control 118, treater water level control 118' and treater oil level control 118") and each compartment preferably comprises a liquid level control and an outlet (as best illustrated from the end view of FIG. 4D).

Figure 4A:
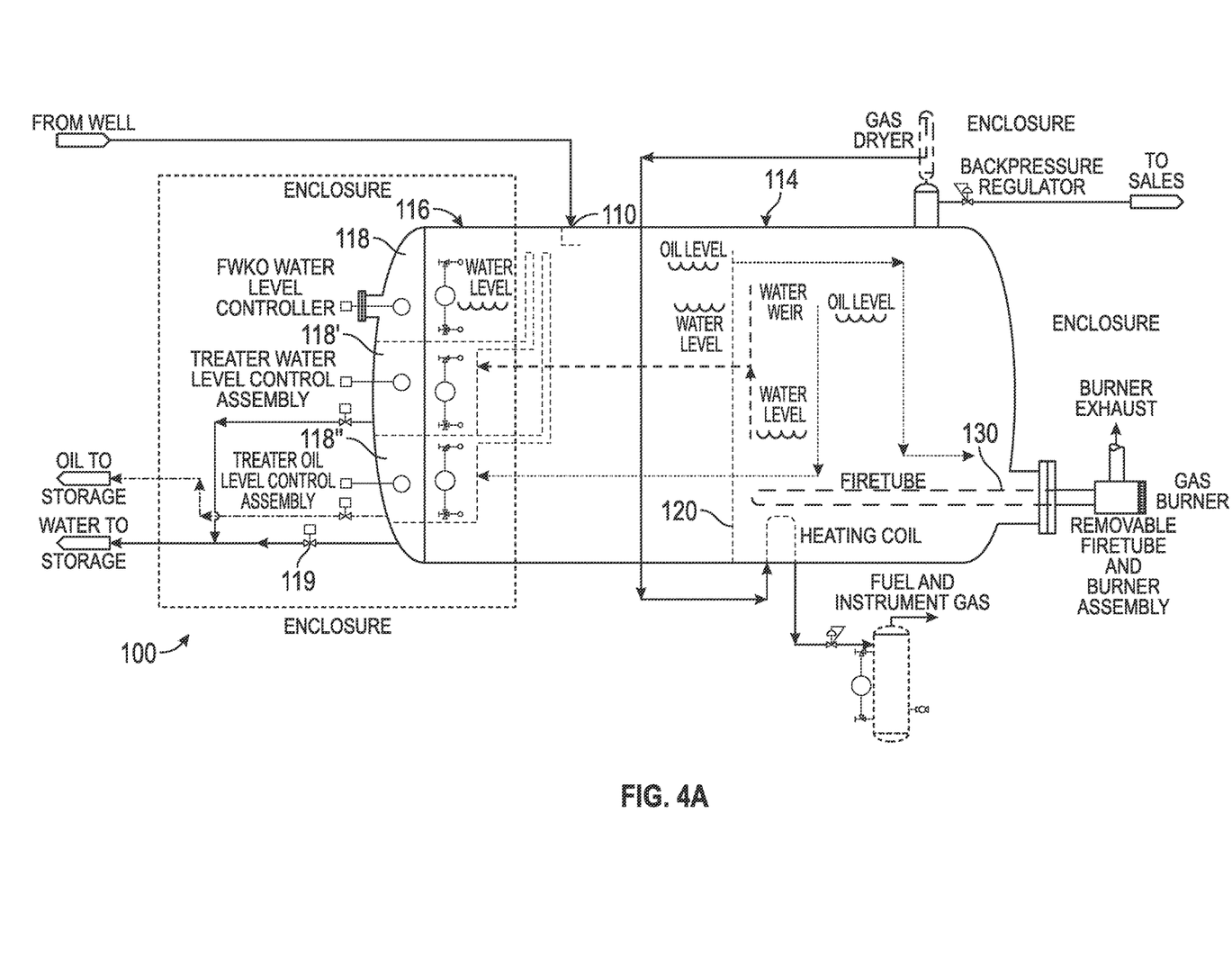
FIG. 4A is a drawing which illustrates a schematic drawing which illustrates an embodiment of the present invention wherein a free water knockout is incorporated into a heater treater.
Figure 4B:
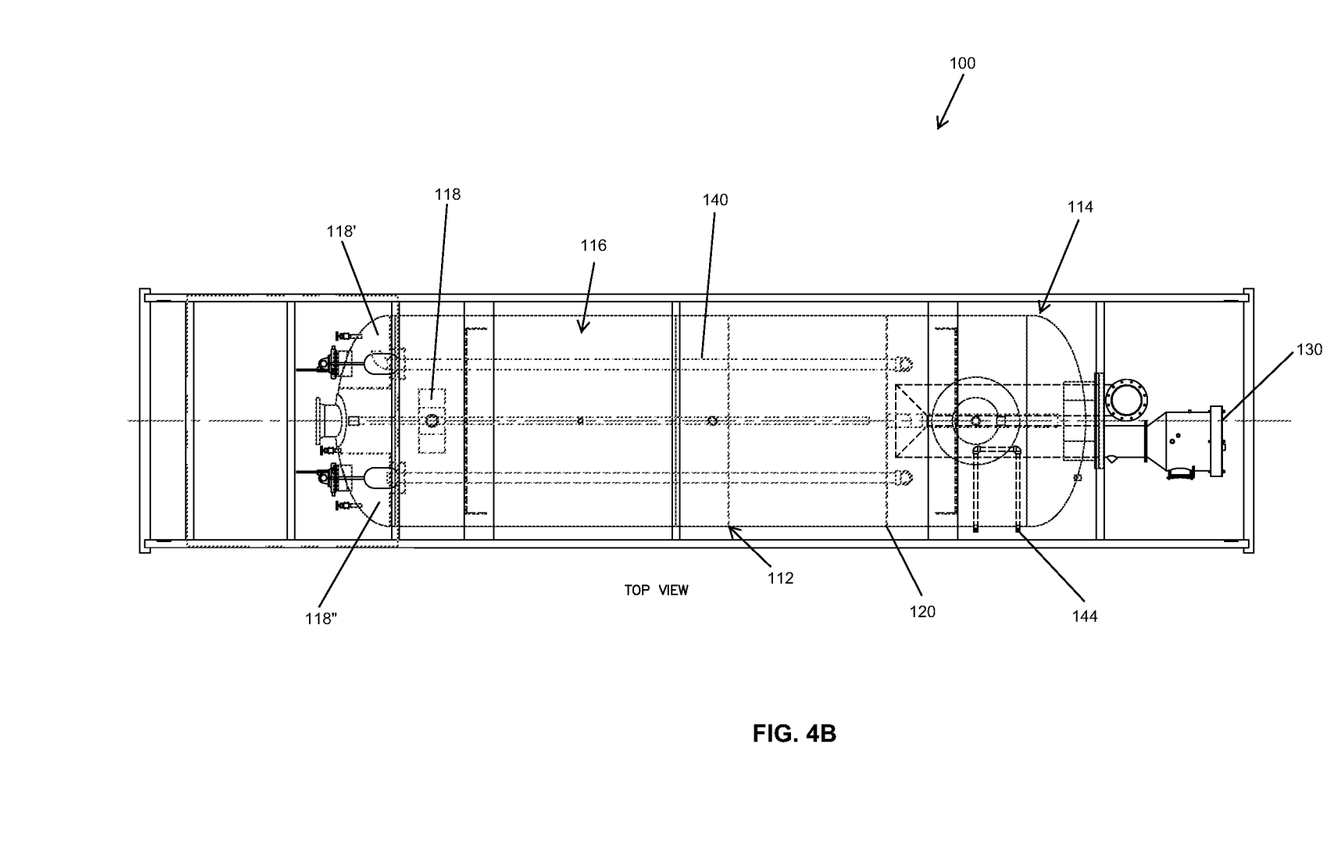
FIGS. 4B-E are drawings which respectfully illustrate top, side, left, and right side views of an embodiment of the present invention wherein a free water knockout is incorporated into a heater treater according to an embodiment of the present invention.
Figure 4C:
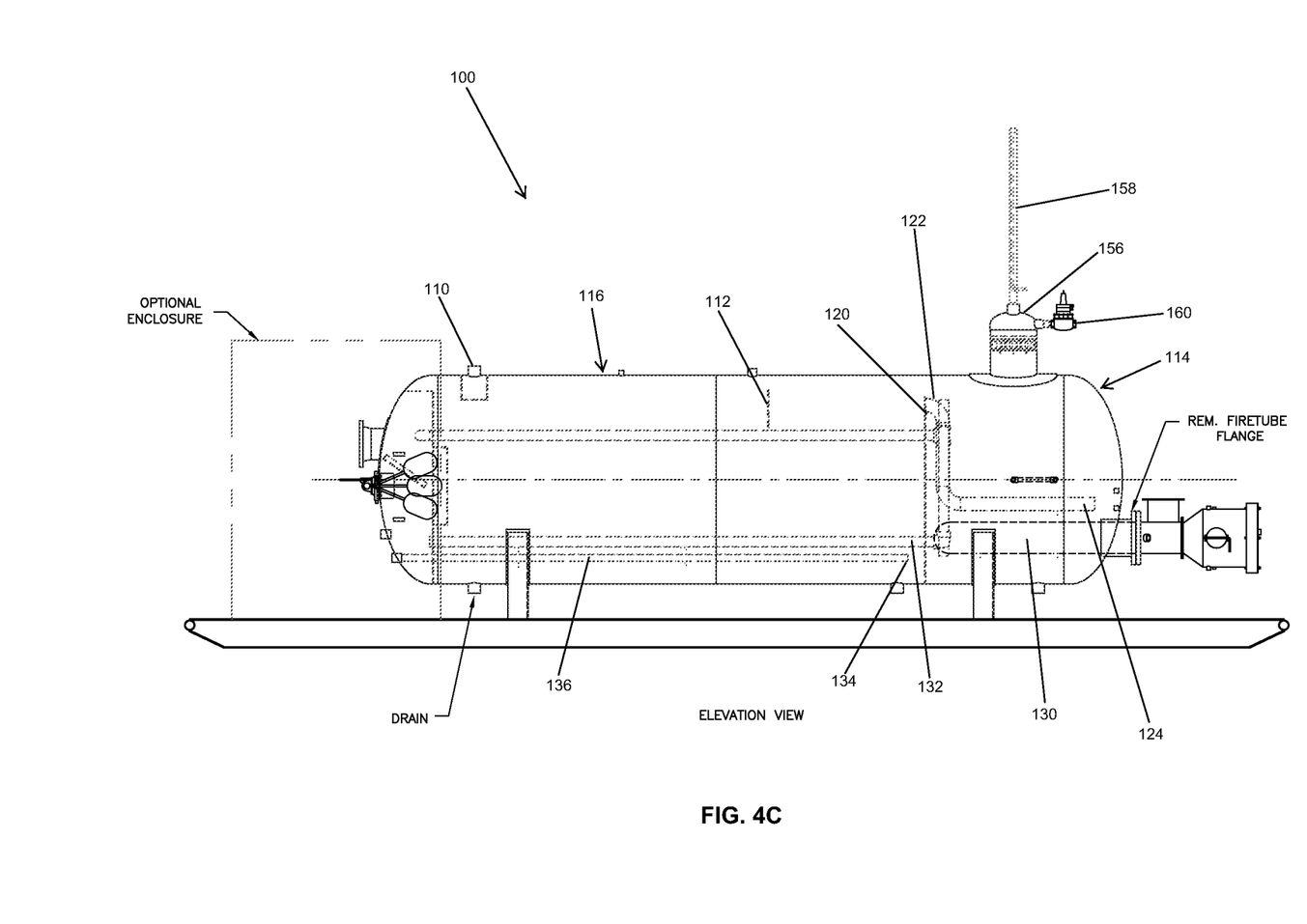

Free water knockout portion 116 preferably removes the water that separates from the oil without heating the fluid. Referring to FIG. 4A, the produced gas, water, and oil enter at point 110. Through the effects of gravity, water that has separated from the oil and gas settles to the bottom of free water knockout portion 116. As best illustrated in FIG. 4C, the freed oil flows past bulkhead 120 through pipe 122 and exits pipe 122 at outlet 124. Outlet 124 is preferably disposed toward the back of firetube 130 (away from bulkhead 120). In one embodiment, firetube 130 can optionally be formed from another device capable of producing the required amount of heat necessary for a specific application of combination unit 100. By positioning outlet 124 of pipe 122 away from bulkhead 120 at the back of firetube 130, the oil is required to flow along firetube 130 and is thus heated before flowing being drawn at point 131 (see FIG. 4E) into oil pipe 132, which passes through bulkhead 120. The oil-free water that collects in free water knockout portion 116 preferably fills portion 116 to the water level controlled by liquid level control 118. Liquid level control 118, which preferably includes motor valve 119, to dump the water from combination unit 100. In this embodiment, water is preferably drawn from portion 116 at point 134 of pipe 136 (see FIG. 4C). The location of point 134 is preferably near the bottom of free water knockout portion 116, near bulkhead 120, such that water flowing from there is as turbulent-free as possible and has the most retention time possible so that a maximum amount of oil can separate from the water before it is drawn from free water knockout portion 116.

Water which is freed from the oil in heater tank portion 114 is preferably removed from a lower area of heater tank portion 116 at point 138 of pipe 140. Pipe 140 preferably extends above the expected oil level to point 142 and is open to the gas pressure within heater tank portion, thus forming a weir. Pipe 140 then preferably passes through bulkhead 120 to treater water level control 118'.

In one embodiment, all of the oil and water boxes and their respective controllers, 118 118' and 118", are preferably provided in the free water knockout portion 116 simply to accommodate all the liquid level controllers being located on one head to provide user-friendly access. Desirable results thus could of course be achieved by providing them in an alternative location.

In one embodiment, fuel gas preheating coil 144 can optionally be disposed in treater tank portion 114 to preheat the fuel gas before it is fed into firetube 130. In a further embodiment, one or both of a treater bath temperature indicator 146 and a treater bath thermostat 148 can optionally be disposed in treater tank portion to provide the ability to maintain a controlled temperature and/or range of temperatures for the liquids contained therein.

Figure 4D:
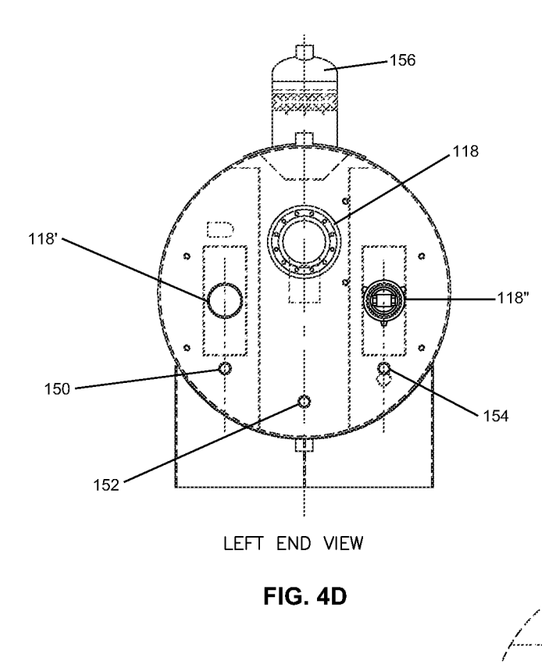
Figure 4E:
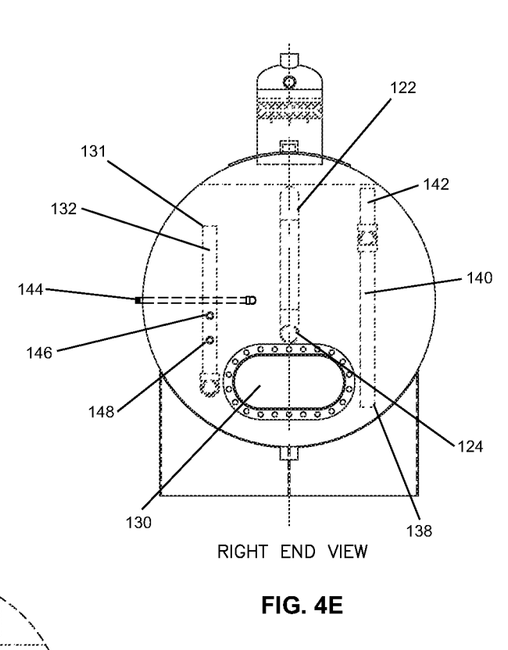
Figure 4F:
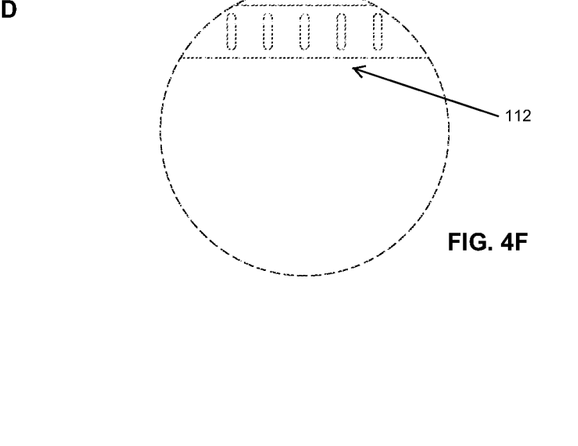
FIG. 4F is a drawing illustrating a quieting baffle according to an embodiment of the present invention which is preferably used in the embodiment illustrated in FIGS. 4B-E.

FIG. 4D illustrates the outlets of water that is thus dumped from the treater, the free water knockout, and the oil that is dumped from the treater (150, 152, and 154 respectively).

As best illustrated in FIG. 4C, gas dome 156 and gas dryer 158 are preferably provided to remove the evolved gases and to dry them. Back pressure regulator 160 can also optionally be provided.

Figure 5:
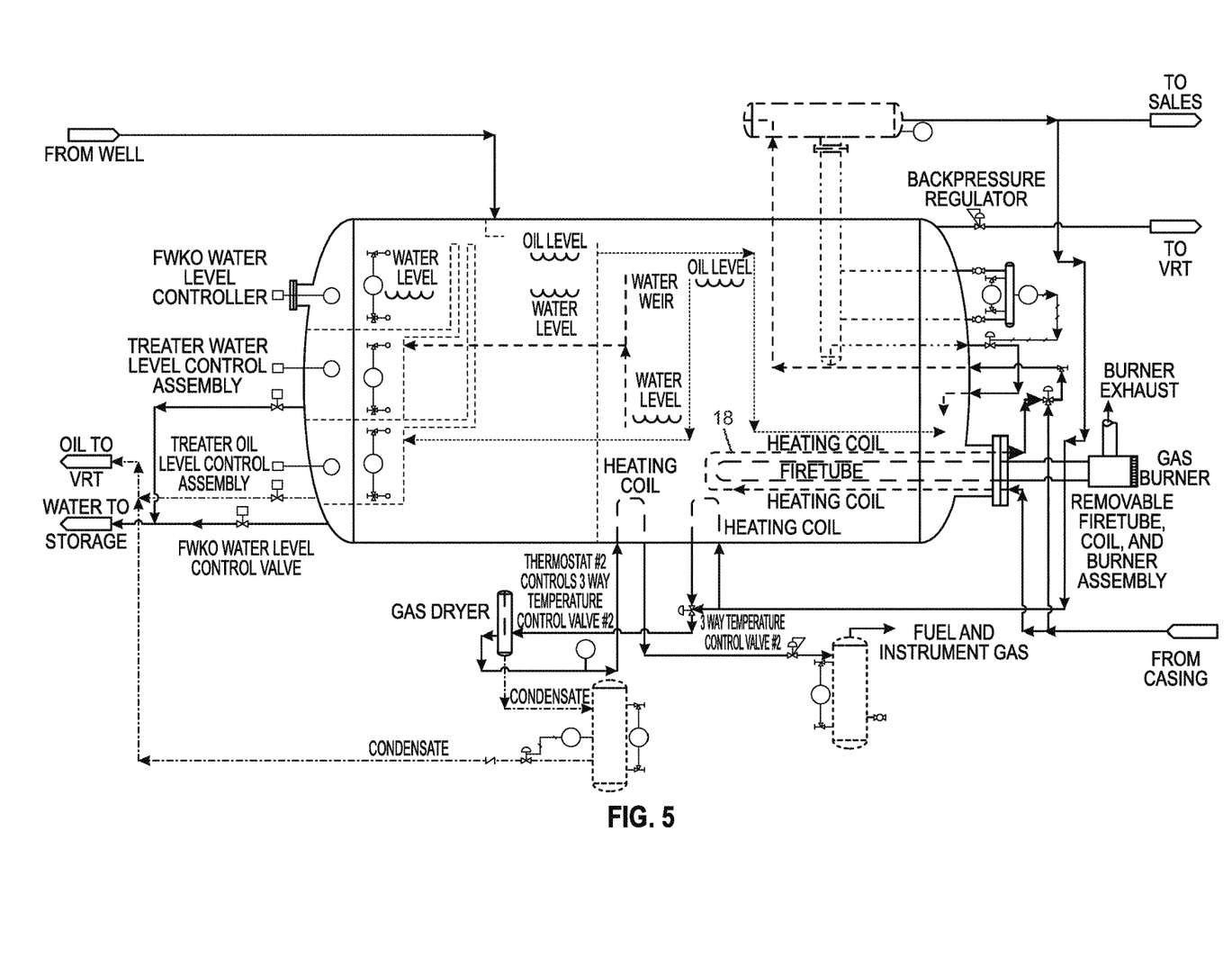
FIG. 5 is a drawing which illustrates an embodiment of the present invention wherein a heater treater, instrument gas heater/dryer, sales gas heater, gas separator and a free water knockout are all incorporated into a single unit.

FIG. 5 illustrates an embodiment of the present invention wherein a heater treater is combined with a two-phase separator (a.k.a. a "gas separator"), a sales gas heater, an instrument gas and/or instrument gas dryer (a.k.a. a "instrument gas heater/dryer"), and a free water knockout. Although the figure illustrates numerous components incorporated into a single unit. Any one, two, or three of these can be removed such that only a heater treater and one or more other components are incorporated therein. For example, with the present invention, the following combinations of units are possible:

1) a heater treater and a two phase separator;
2) a heater treater, two phase separator, and a free water knockout;
3) a heater treater, two phase separator, free water knockout, and a sales gas heater;
4) a heater treater, two phase separator, free water knockout, sales gas heater; and an instrument gas heater/dryer;
5) a heater treater, two phase separator, free water knockout, and an instrument gas heater/dryer;
6) a heater treater, two phase separator, sales gas heater, and an instrument gas heater/dryer;
7) a heater treater, two phase separator, and a sales gas separator;
8) a heater treater, two phase separator, and an instrument gas heater/dryer;
9) a heater treater, sales gas heater, and an instrument gas heater/dryer;
10) a heater treater and a sales gas heater;
11) a heater treater and an instrument gas heater/dryer;
12) a heater treater and a free water knockout;
13) a heater treater, free water knockout, and a sales gas heater;
14) a heater treater, free water knockout, sales gas heater, and an instrument gas heater/dryer;
15) a heater treater, free water knockout, and an instrument gas heater/dryer; and
16) a heater treater, sales gas heater, and an instrument gas heater/dryer.

In one embodiment, the present invention can optionally accommodate and process natural gas that is provided at a high pressure—for example at pressures in excess of 200 PSI and more preferably in excess of 300 PSIG, while simultaneously accommodating and processing oil and/or water which can be artificially lifted from inner tubing at a much lower pressure—for example less than 100 PSIG. Thus, in one embodiment, the present invention can process flows of fluids wherein at least one of the fluids is being artificially lifted from a well. In one embodiment, one or more of the sales gas heater, the instrument gas heater/dryer, the separator, and the free water knockout are preferably in thermal communication with the heater treater. In one embodiment, in one embodiment, one or more of the sales gas heater, the instrument gas heater/dryer, the separator, and the free water knockout comprise a portion which is disposed within a vessel and/or shell of the heater treater. In one embodiment, one or more of the sales gas heater, the instrument gas heater/dryer, the separator, and the free water knockout are not physically separated from the heater treater. In one embodiment, the present invention is disposed at a wellsite and is not disposed at another location.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A combination unit comprising:
   a heater treater portion comprising a gas heater;
   a knockout portion;
   a bulkhead, said bulkhead dividing said combination unit into said heater treater portion and said knockout portion;
   a two-phase separator disposed in a top of said heater treater portion;
   a first heating coil;
   a condenser, said condenser communicably coupled to said heating coil;
   a second heating coil coupled such that instrument gas can pass therethrough after having already passed through said condenser;
   wherein an end of the knockout portion is divided into three compartments, a first of said three compartments comprising a free water knockout compartment, a second of said three compartments comprising a treater water level compartment, and a third of said three compartments comprising a treater oil level compartment, each of said three compartments comprising a level control; and
   said first and said second heating coils disposed within said heater treater portion.

2. The combination unit of claim 1 further comprising an inlet separator wherein a lower portion of said inlet separator is disposed within said heater treater portion.

3. The combination unit of claim 1 further comprising an instrument gas scrubber, an inlet of said instrument gas scrubber in fluid communication with an outlet of said second heating coil.

4. The combination unit of claim 1 further comprising a gas scrubber, an inlet of said gas scrubber in fluid communication with an outlet of said condenser.

5. The combination unit of claim 1 wherein said first heating coil and said condenser operate together as an instrument gas dryer.

6. The combination unit of claim 1 wherein said heater treater portion, said gas heater, and said two-phase separator are all disposed on a single transportable frame.

7. A combination unit comprising:
a heater treater portion comprising a gas heater;
a knockout portion;
a bulkhead, said bulkhead dividing said combination unit into said heater treater portion and said knockout portion;
a two-phase separator disposed in a top of said heater treater portion;
wherein an end of the knockout portion is divided into three compartments, a first of said three compartments comprising a free water knockout compartment, a second of said three compartments comprising a treater water level compartment, and a third of said three compartments comprising a treater oil level compartment, each of said three compartments comprising a level control;
a first heating coil comprising an inlet;
a second heating coil comprising an inlet;
a third heating coil comprising an inlet communicably coupled to an outlet of a condenser; and
said first heating coil, said second heating coil and said third heating coil in thermal communication with one another within the heater treater portion.

8. The combination unit of claim 7 wherein said combination unit is disposed on a single transportable frame.

9. The combination unit of claim 7 further comprising an instrument gas scrubber, an inlet of said instrument gas scrubber in fluid communication with an outlet of said third heating coil.

10. The combination unit of claim 7 wherein said second heating coil and said condenser operate together as an instrument gas dryer.

11. A treater combination unit comprising:
a water weir;
a heat source;
first and second heating coils disposed in said treater combination unit;
a bulkhead, said bulkhead dividing said treater combination unit into a heater treater portion and a knockout portion; and
wherein an end of the knockout portion is divided into three compartments, a first of said three compartments comprising a free water knockout compartment, a second of said three compartments comprising a treater water level compartment, and a third of said three compartments comprising a treater oil level compartment, each of said three compartments comprising a level control.

12. The treater combination unit of claim 11 wherein said treater combination unit is disposed on a single transportable frame.

13. The treater combination unit of claim 11 wherein a lower portion of an inlet separator is disposed within said heater treater portion.

14. The treater combination unit of claim 11 further comprising an instrument gas scrubber, an inlet of said instrument gas scrubber in fluid communication with an outlet of a third heating coil disposed within the heater treater portion.

15. The treater combination unit of claim 11 further comprising a gas scrubber, an inlet of said gas scrubber in fluid communication with an outlet of a condenser.

16. The treater combination unit of claim 15 wherein said second heating coil and said condenser operate together as an instrument gas dryer.

* * * * *